INVENTORS:
WILHELM BAASNER,
HANS GUNTHER and
KARL HUBER

BY

THEIR ATTORNEYS

United States Patent Office 2,794,365
Patented June 4, 1957

2,794,365

LIGHT PROJECTING AND ILLUMINATING SYSTEM FOR COPYING COLORED ORIGINAL PICTURES

Wilhelm Baasner, Hans Gunther, and Karl Huber, Munich, Germany, assignors to Agfa Camera-Werk Aktiengesellschaft, Munich, Germany, a corporation of Germany Continuation of application Serial No. 215,801, March 15, 1951. This application November 21, 1955, Serial No. 548,280

Claims priority, application Germany March 23, 1950

10 Claims. (Cl. 88—24)

This invention is a continuation of our copending application, "Illuminating System for Copying Colored Pictures," filed March 15, 1951, and bearing SN 215,801, now abandoned. More particularly, the invention relates to an illuminating system provided with means for making changes in the spectral composition of the light employed for making copies of colored originals. More particularly, it concerns photographic copying and enlarging apparatus wherein the light developed by the copying lamp is collected by means of a condenser and then conducted through a color filter before it illuminates the original.

Whenever colored negatives or diapositives that are to be copied display an overall off color tone, it is customary to try to remove such imperfection by the application of correction filters in the copying or enlarging operation. Heretofore it has been the practice to insert filters having the necessary color characteristics into the path of the light coming from the copying lamp, in such a manner that the entire light bundle was colored, or rather that light rays of certain wave lengths were filtered out of the white or almost white copying light. It was, however, necessary to choose a special filter for each color density, so that a very large number of correction filters was required to meet the various types of color imperfections encountered in practice.

The object of our invention is to simplify and improve the filter arrangement for such copying and enlarging apparatus and to reduce the number of correction filters required for their operation. Additional objects and advantages will become apparent as the detailed description proceeds.

According to our invention the copying and enlarging apparatus that serves for the production of colored prints is provided with correction filters that are slidably insertable into the plane of the aperture diaphragm of the usual condenser. Contrary to the previously known arrangements, these filters need only be partially inserted into the light bundle, so that, depending upon the depth of insertion, any desired color shading or density of the copying light can be attained. Furthermore, by our arrangement such change in color or density is attained uniformly over the entire surface of the original to be copied, despite the fact that only a portion of the light bundle was required to pass through one or more of the correction filters.

In the apparatus of our invention, we prefer to employ filters of maximum density that are replaceably arranged in holders. Usually three such filters are employed, one for each of the primary colors. The filter holders are moved in and out of the path of the light at the aperture diaphragm of the condenser by means of cams and springs or equivalent lever arrangements, to such an extent as may be required to attain the desired color density. Every point on the curved surfaces of said cams corresponds to a particular degree of filtration which can be read off directly from a scale. Each of the cams is preferably adjustable by means of a knob which shows the degree of filtration directly upon a scale. Instead of the cams other suitable actuating means for the filter holders, such as lever arrangements, may be employed.

A particularly useful embodiment of our invention results from the arrangement of a transparent sheet having the same color as the correction filter indicated thereby upon the common axis of the cam and the knob, whereby the source of the copying light may be employed for illuminating from within a scale engraved upon said transparent colored sheet.

In order to handle cases in which an unusually strong filtration is required to correct the color tone, we may provide supplemental light filters, one for each of the primary colors, upon a rotatable plate which can be turned by means of a knob to interpose any one of these supplemental filters, if desired, into the path of the illuminating light. By introducing such supplemental filters one may obtain a double field of adjustment, i. e. the degrees of filtration indicated on each of the above mentioned scales may thereby assume two different values, depending upon whether or not the corresponding supplemental filter is employed.

Our apparatus, generally described above, serves for copying or enlarging colored negatives made by the subtractive process and permits correction of all kinds of color adulterations normally encountered.

An embodiment of our invention is illustrated by way of example in the accompanying drawings which show:

Figure 1:
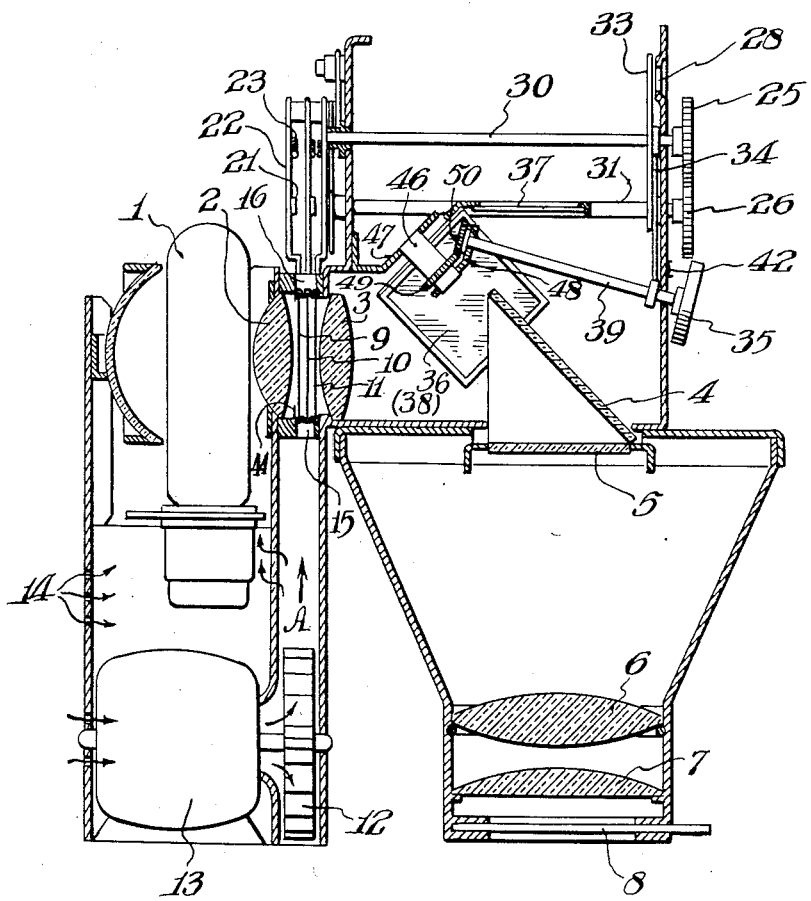
Fig. 1 is a side view in section of the illuminating system of a copying and enlarging apparatus according to our invention with the usual cover removed.

The copying light originating from the projection lamp 1 passes through the lenses 2 and 3 of the usual condenser and is reflected by the mirror 4 upon the opalescent plate 5. The focal length of the condenser is so chosen that the filament of the projection lamp 1 is portrayed in the vicinity of the opalescent plate 5. Thus the opalescent plate itself acts as a new source of light. The diffused light that originates from the opalescent plate 5 is now collected by means of a second condenser composed of the lenses 6 and 7 and directed through the colored negative 8 that is to be copied.

The correction filters 9, 10 and 11, one for each primary color, are slidably arranged between the lenses 2 and 3 of the first condenser in the plane of the aperture diaphragm. In order to cool these correction filters and the projection lamp 1, there is provided a fan 12 that is actuated by a motor 13. The projection lamp 1 is additionally subjected to a natural air current, since the air that is heated by the lamp rises and pulls in cooling air through the openings 14. The artificial stream of cooling air is pulled in through the windings of the motor 13 by the fan 12 and forced into the direction of the arrow A so that most of it passes through the opening 15 along the correction filters and out of the opening 16. Such artificial cooling is necessary to protect the filters from excessive heating and to give them a long life.

Figure 2:
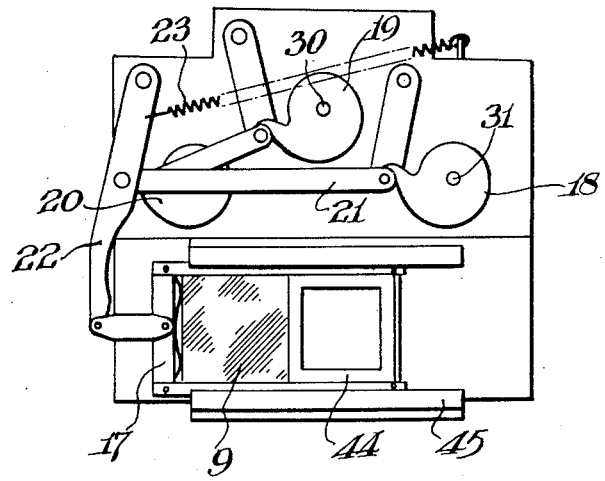
Fig. 2 is a rear view of the upper part of that illuminating system showing the means provided for interposing the individual correction filters as desired.

As may be seen from Fig. 2, the correction filters 9, 10 and 11, which are replaceably arranged in the filter holders 17 are actuated by means of the cams 18, 19 and 20. Only one filter 9 with its complete actuating system is shown, because the others are substantially covered thereby. A contact lever 21 slides over the curved surface of the cam 18 and transmits the movement caused by the inclination of said curved surface to the filter holder 17 and filter 9 by means of the lever system 22. This lever system 22 is pressed continuously against the curved surface of the cam 18 by means of the spring 23. Similar arrangements are provided for actuating the filters 10 and 11 by means of the cams 19 and 20, respectively.

Figure 3:
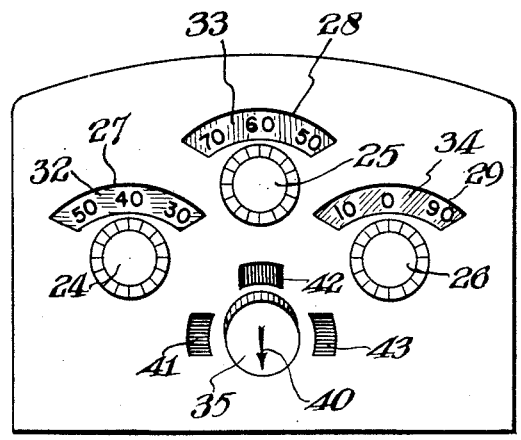
Fig. 3 is a front view of the upper part of the illuminating system showing the control knobs and scales for the individual filters.

The filters 9, 10 and 11 are colored in the three primary colors—yellow, purple and blue-green—and serve for the correction (compensation) of all color adulterations of the originals to be copied. The filter actuating means just described and the control knobs 24, 25 and 26 shown in Fig. 3 enable the operator to move the desired color filter 9, 10 or 11 or any combination thereof to the extent required, into the light bundle from the projection lamp 1 as it passes through the aperture diaphragm of the condenser composed of the lenses 2 and 3. By means of some known method the color tone, and thus the required kind and degree of filtration, may be determined beforehand for each colored negative to be copied, and noted upon the tag accompanying that negative. The operator of our copying apparatus may now simply turn the control knobs 24, 25, and/or 26 until the predetermined degree of filtration can be read from the transparent scale discs 32, 33 and 34 appearing in the windows 27, 28 and 39, respectively. Said transparent scale discs are mounted upon the shafts 30 and 31 (the first shaft being covered in Fig. 2), which connect the control knobs 24, 25 and 26 with the cams 18, 19 and 20, respectively. The scale discs are illuminated from within by means of scattered light from the projection lamp 1 or, if desired, a separate light source, thereby facilitating reading of the scales and the adjustment of the control knobs. Preferably, the scale discs are colored in the same primary colors as are the filters to which they refer. For example, as shown in Fig. 3, the yellow filter may be adjusted to a point indicated by the figure 40 on the yellow scale 32 by means of the knob 24, the purple filter to 60 on the purple scale 33 by the knob 25, while the blue-green filter is withdrawn, as shown by zero on the blue-green scale 34.

For the purpose of permitting correction of unusually strong color adulterations of the originals to be copied, a supplemental set of filters composed of especially dense filters of each primary color is provided. Any one of these supplemental filters may, if desired, be swung into the light path from the first condenser 2, 3 to the mirror 4 by means of the control knob 35. The supplemental filters 36, 37, and 38 (the last not shown in Fig. 1) are arranged in the form of a pyramid about a shaft 46, pivotably mounted in the angle plates 47, 48, the filters forming an angle of about 180° with each other. By this arrangement the filters are always in a vertical position to the optical axis of the condenser lens, when swung into operative position. On the shaft 46 a pinion 49 is fixed which engages another pinion 50 on the shaft 49. In the position shown in Fig. 1 and indicated by the arrow 40 of the control knob 35 (see Fig. 3) none of these supplemental filters lies in the path of light from the projection lamp 1. However, upon turning the control knob 35 until the arrow 40 thereon points to one of the fields 41, 42 or 43, the respective supplemental filter indicated thereby is introduced into the light path. Preferably said fields 41, 42 and 43 are made of differently colored transparent material, each color corresponding to that of the supplemental filter indicated thereby, and lighted from within as are the transparent scales 32, 33 and 34.

A rectangular diaphragm 44 is provided between the lens 2 of the first condenser and correction filters 9, 10 and 11, so that the light bundle transmitted thereby is shaped into a form corresponding to that of the correction filters. Said filters, together with their holders, are each slidably mounted in a slide 45, so that they can be brought into any desired position of insertion with respect to the light bundle by means of cams 18, 19 and 20, thus permitting the required degree and kind of color filtration from the white or almost white projection light. Instead of the forced air cooling system, one may also employ filters or layers that have the capacity to absorb heat rays.

The illuminating system herein described is preferably so constructed that it may be attached to various types of copying and enlarging apparatus, thus rendering it suitable for various picture sizes.

As many apparently widely different embodiments of this invention may be made without departing from the spirit and scope hereof it is to be understood that this invention is not limited to the specific embodiments hereof, except as defined in the appended claims.

We claim:

1. Apparatus for copying colored originals, which comprises in operative optical alignment a projection lamp, an opalescent plate illuminated thereby and serving as a secondary light source, a condenser lens means including an aperture diaphragm between said projection lamp and opalescent plate so that it portrays an image of said lamp upon said opalescent plate, a second condenser disposed for collecting the light from said opalescent plate and directing it upon one of said originals, at least one uniformly light permeable correction filter for one of the primary colors, and means for slidably and adjustably inserting said color correction filter in the immediate proximity of the plane of the aperture diaphragm into the light bundle passing through that condenser, whereby depending on the depth of insertion any desired color density over the entire surface of the original to be copied, can be attained.

2. Apparatus as defined in claim 1, wherein the means for inserting the color correction filter include a slide support adjacent the condenser, a filter holder supported thereby and means for controlling the filter holder for moving it to control the color density.

3. Apparatus as defined in claim 1, wherein the means for inserting the color correction filter include a slide support adjacent the condenser, a filter holder supported thereby, cams for controlling the filter holder for moving it to control the color density, each point of each cam corresponding to a definite degree of filtration.

4. Apparatus as defined in claim 1, wherein the means for inserting the color correction filter include a slide support adjacent the condenser, a filter holder supported thereby, cams for controlling the filter holder for moving it to control the color density, and a manually adjustable lever system connecting said cams and filter holders.

5. Apparatus as defined in claim 1, wherein the means for inserting the color correction filter include a control knob for turning a cam operated by the control knob that indicates the degree of filtration on a scale.

6. Apparatus for copying colored originals, which comprises in operative optical alignment a projection lamp, an opalescent plate illuminated thereby and serving as the secondary light source, a condenser lens means including an aperture diaphragm between said projection lamp and opalescent plate, said condenser lens means being composed of several lenses, three uniformly light permeable correction filters each for a different one of the primary colors, and means for slidably and adjustably inserting one and more of these color correction filters into the light bundle passing through said condenser lens means between the lenses thereof.

7. Apparatus as defined in claim 4, wherein for unusually strong color adulterations independent means are provided for inserting a set of supplemental filters into the light path.

8. Apparatus as defined in claim 7, wherein the filters of the supplemental set are arranged in the form of a pyramid about a shaft actuated by a control knob, the filters forming an angle of about 180° with each other.

9. Apparatus as defined in claim 5, comprising transparent windows with transparent scales therein, said scales being pivotally arranged on the axes of the control knobs and illuminated by means of scattered light from the projection lamp, thereby indicating the degree of filtration.

10. Apparatus as defined in claim 9, wherein the transparent scales are colored in the same primary colors as are the filters to which they refer.

References Cited in the file of this patent
UNITED STATES PATENTS

| | | |
|---|---|---|
| 1,334,853 | Griffith | Mar. 23, 1920 |
| 1,613,562 | Frost | Jan. 4, 1927 |
| 1,633,228 | Rogers | June 21, 1927 |
| 1,661,757 | Jones | Mar. 6, 1928 |
| 1,716,322 | Proctor | June 4, 1929 |
| 1,762,932 | Mihalyi | June 10, 1930 |
| 1,891,683 | Morsbach | Dec. 20, 1932 |
| 2,063,312 | Hopkins | Dec. 8, 1936 |
| 2,385,770 | Birch-Field | Oct. 2, 1945 |
| 2,498,294 | Pennow et al. | Feb. 21, 1950 |
| 2,603,125 | Evers | July 15, 1952 |